No. 665,511. Patented Jan. 8, 1901.
H. M. CRITTENTON.
WEIGHING SCALE OR BALANCE.
(Application filed Sept. 30, 1898.)
(No Model.) 2 Sheets—Sheet 1.
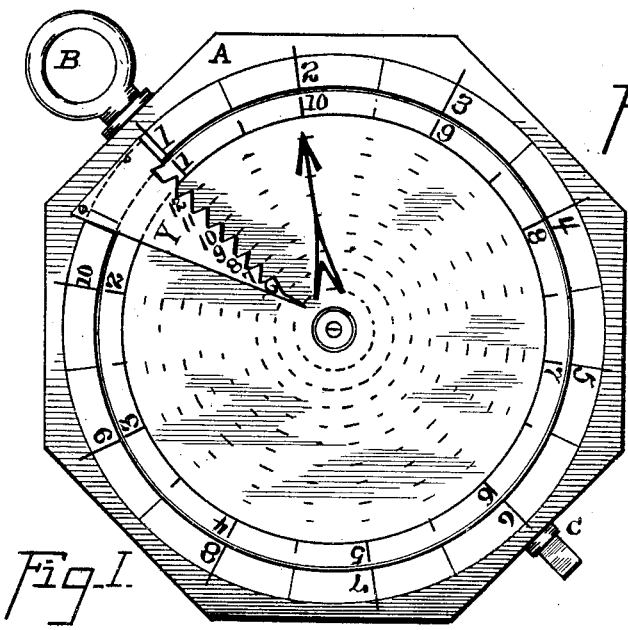
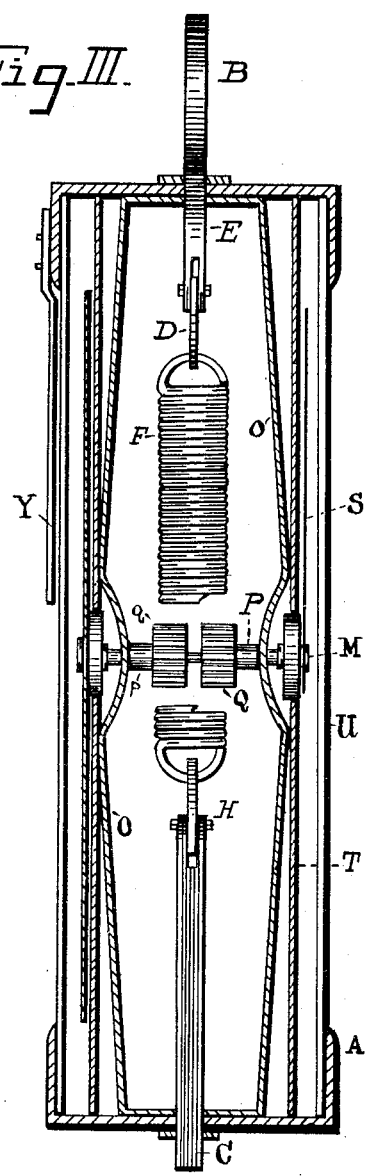
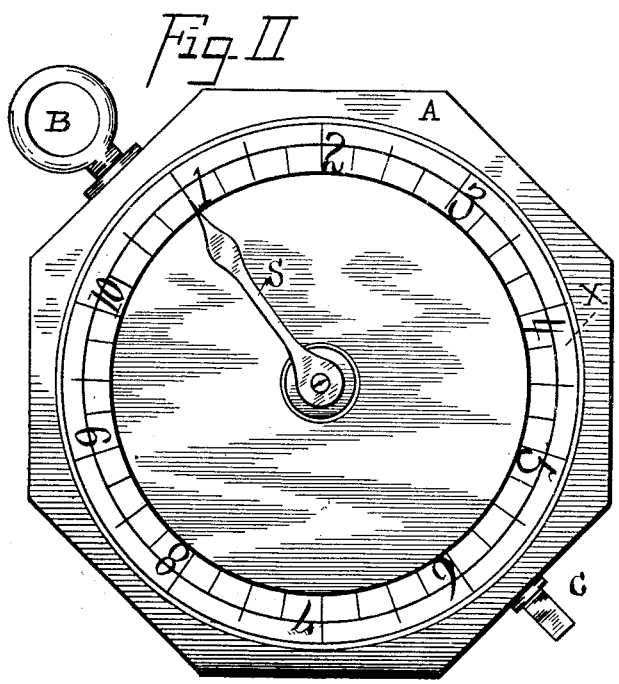
WITNESSES
Chas. K. Davies.
T. W. Johnson.
INVENTOR
H. M. Crittenton
By W. A. Bartlett
Attorney
THE NORRIS PETERS CO., PHOTO-LITHO., WASHINGTON, D. C.

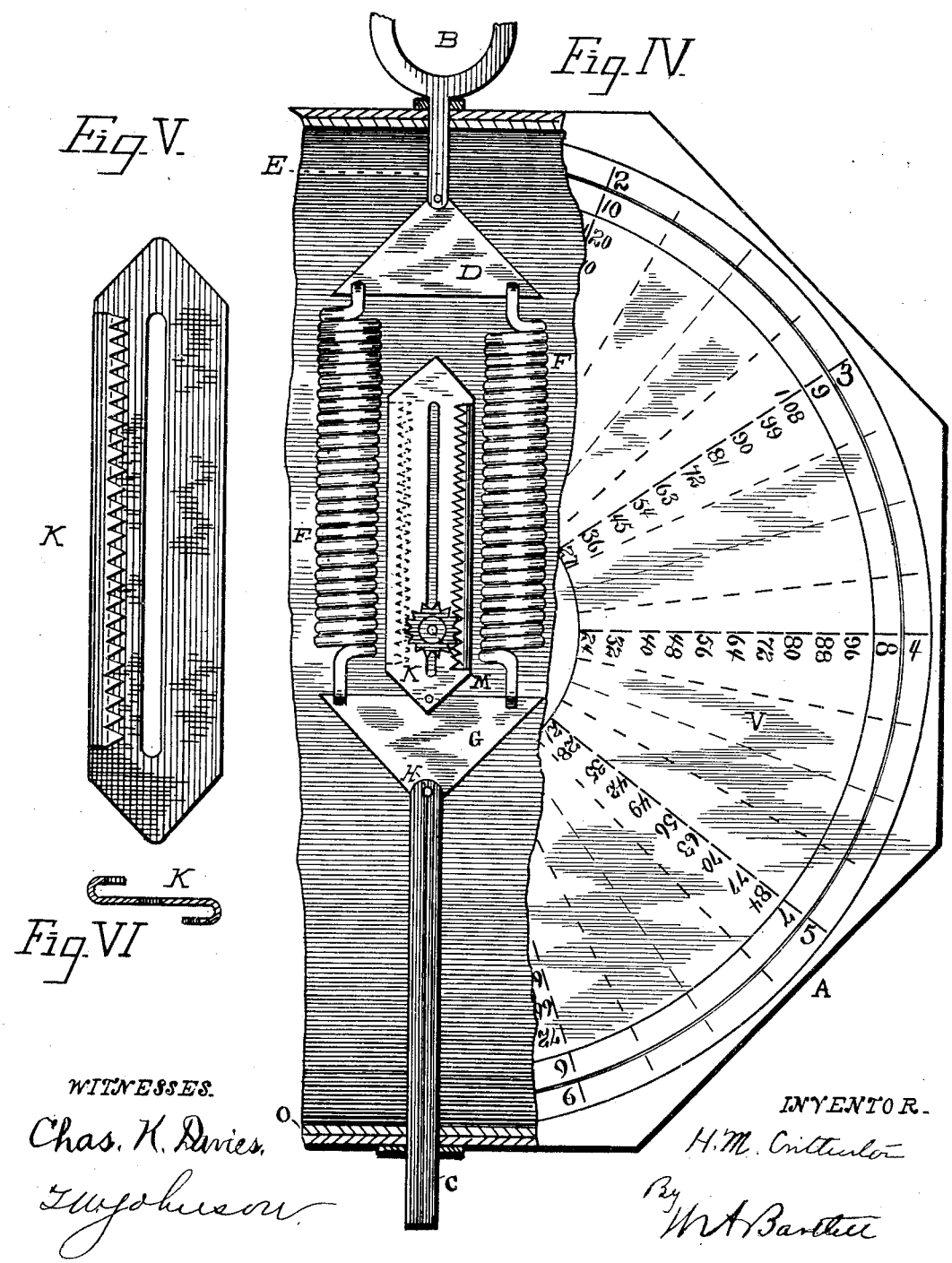

UNITED STATES PATENT OFFICE.

HARLOW M. CRITTENTON, OF CHICAGO, ILLINOIS.

WEIGHING SCALE OR BALANCE.

SPECIFICATION forming part of Letters Patent No. 665,511, dated January 8, 1901.

Application filed September 30, 1898. Serial No. 692,296. (No model.)

*To all whom it may concern:*

Be it known that I, HARLOW M. CRITTENTON, residing at Chicago, in the county of Cook and State of Illinois, have invented certain new and useful Improvements in Weighing Scales or Balances, of which the following is a specification, reference being had therein to the accompanying drawings.

This invention relates to spring balances or scales, and the principal features of the invention apply to computing-scales.

The object of the invention is to construct a computing-scale which may be read to the weight from both sides or faces, but in which the computation is effected on one side or face only; also, to have the index hands or pointers on the opposite sides or faces of the scale move in the usual direction, which is relatively in opposite directions; also, to improve the construction of scales or weighing apparatus in details, as will be shown and described.

Figure I shows a plan or elevation of the rear or computing face of the scale or balance, the pan and the figures of the computing-scale being omitted, as being on so small a scale confusion would likely ensue should an attempt be made to show the figures. Fig. II is a front or face view of the scale, with pan omitted. In these views for convenience the scale is not shown in upright position on the sheet. Fig. III is a vertical cross-section of the scale enlarged. Fig. IV is a broken section and partial elevation of the computing side of the scale. Fig. V is a face view of the double rack-bar, and Fig. VI is a cross-section of the same.

The case or inclosing box A may be of any usual size, style, and material, the general appearance of a clock being considered desirable. The case is provided with a hook or suspending-ring B and the pan or hook is attached to the weigh-bar C. The ring B supports the equalizing-yoke D by means of link E. The yoke D is firmly connected to the ring, and two coiled springs F F are attached at opposite ends of yoke D. The lower ends of the springs F are connected to the yoke G, which is the support of the draw-rod C, by means of pivot H. As a slight pivotal movement is allowed to each of the yokes D and G, any inequality of the springs is rectified in great part by their joint action. Should one spring be slightly weaker than the other, such spring will yield the most under weight; but the average of the two will be the result of such equalizing.

To the yoke G the double rack or actuating bar K is attached. This bar is preferably a piece of sheet metal with a rack on each edge, and each edge is turned back in a U-shape bend, so that the rack-teeth face toward the center of the bar, but at opposite sides of the plate, (see Fig. VI,) and the plate is centrally slotted.

A rod or axle M passes through the casing, being supported in a frame O, which extends from top to bottom inside the casing and has bearings for this axle. On each end of axle M there is a sleeve P. Sleeve P has a rigid ratchet-wheel Q, which engages with one of the racks of bar K. At the outer end of this sleeve the index-hand or pointer S is attached, preferably outside the dial T, but inside of glass U. On the other end of axle M a sleeve $p$, having a ratchet-wheel $q$, is attached, which ratchet engages the other rack of the rack-bar. Thus as the rack-bar is drawn down by a weight or pull on the bar C the rack-bar by its engagement with the ratchet-wheels will cause said wheels and their sleeves to rotate in opposite directions.

The computing dial-plate V is connected to sleeve $p$, so as to rotate therewith. This dial-plate is preferably a disk nearly as large as the casing to give room for a large number of figures. One part of the dial bears a hand or index corresponding to the pointer on the weighing side of the scale, and a ring X, outside the dial, bears figures to denote the weight. The computing-dial will rotate to the same extent to which the hand S rotates, but in reverse direction when there is a pull on the bar, and the two faces of the instrument will give corresponding indications as to weight; but neither need be read backward.

The computing-dial bears figures, arranged according to an arbitrary plan, to indicate the amount or value of an article of a given weight at a given price, and a fixed guide on the casing operates in connection with the computing-dial. Preferably this guide or pointer is notched and has one or more rows of figures thereon. In the drawings the guide shows figures from "6" to "12." In such case one radial row of figures on the computing-dial would correspond to the figures on the guide or pointer. In the next complete row, at a distance equal to the space traversed by the dial in weighing a unit—say a pound—the double of these figures would be arranged, and at the three-pound row the gage-numbers multiplied by three, and so on, while at intermediate points fractional numbers may be applied, as also on the pointer. The notched guide has teeth 8 9 10, &c., at one side thereof, these teeth serving as convenient bases for marking the divisions between the annular rows of computing figures or marks on the dial.

If the balance be made to weigh up to a second or third revolution of the index-hand, as is common, a double provision of figures may be made on dial and pointer, and by preference these figures will appear in different colors, as black and red.

The movement of the computing-dial is such that the figures corresponding to a value at a given price per unit of weight are brought opposite the unit of value on the pointer, so the computation is really made by the scale.

What I claim is—

1. In a weighing-scale, an actuating-bar to which the weight is connected, said bar having actuating-faces at opposite sides of the bar, separate gears engaging each of said actuating-faces of the bar, and indicators on opposite faces of the scale, said indicators moved in opposite directions by the said gears, all combined substantially as described.

2. In a weighing-scale, the actuating-bar connected to the weight, said actuating-bar having inturned gear-teeth at its opposite inturned edges, a gear-wheel engaging each of said sets of gear-teeth, an indicating-hand on one face of the scale rotated in one direction by one of said gears, and a computing-dial on the opposite face of the scale rotated in contrary direction by the other gear, all combined substantially as described.

3. In a spring-balance, the two coiled springs each connected at each end to an equalizing-bar, one of said equalizing-bars being pivotally connected at its center to the suspending hook or ring, the other bar, being pivotally connected at its center to the draw-rod by which the weight is supported, all combined substantially as described.

4. In a spring-balance, the supporting ring or hook, an equalizing-bar pivotally connected thereto, a coiled spring connected to each end of said equalizing-bar, a second equalizing-bar connected at its end to the opposite ends of said springs, the draw-rod pivotally connected to said second equalizing-bar, and the actuating-bar pivoted to that one of said equalizing-bars which is pivoted to the draw-rod, said actuating-bar connected to the rotating index or pointer, substantially as described.

In testimony whereof I affix my signature in presence of two witnesses.

H. M. CRITTENTON.

Witnesses:
　HENRY J. MACFARLAND,
　CLARK L. PEYTON.